(12) United States Patent
Hesse

(10) Patent No.: US 10,001,549 B2
(45) Date of Patent: Jun. 19, 2018

(54) METHOD OF DETERMINING THE OPERABILITY OF A SWITCHABLE RECEPTION AMPLIFIER

(71) Applicant: Hella KGaA, Lippstadt (DE)

(72) Inventor: Thomas Hesse, Paderborn (DE)

(73) Assignee: Hella KGaA Hueck & Co., Lippstadt (DE)

( * ) Notice: Subject to any disclaimer, the term of this patent is extended or adjusted under 35 U.S.C. 154(b) by 381 days.

(21) Appl. No.: 14/414,873

(22) PCT Filed: Jun. 29, 2013

(86) PCT No.: PCT/EP2013/063755
§ 371 (c)(1),
(2) Date: Jan. 14, 2015

(87) PCT Pub. No.: WO2014/012772
PCT Pub. Date: Jan. 23, 2014

(65) Prior Publication Data
US 2015/0192662 A1    Jul. 9, 2015

(30) Foreign Application Priority Data

Jul. 18, 2012   (DE) .................. 10 2012 106 506

(51) Int. Cl.
*G01S 7/40* (2006.01)
*B60R 16/03* (2006.01)

(52) U.S. Cl.
CPC ............ *G01S 7/4021* (2013.01); *B60R 16/03* (2013.01); *G01S 7/4004* (2013.01); *G01S 7/4008* (2013.01)

(58) Field of Classification Search
CPC .... G01S 7/4004; G01S 7/4008; G01S 7/4021; B60R 16/03
See application file for complete search history.

(56) References Cited

U.S. PATENT DOCUMENTS

| 4,529,150 A | 7/1985 | Owen et al. |
| 7,804,369 B2 * | 9/2010 | Saunders ................ G01S 7/032 331/25 |
| 2012/0182177 A1 * | 7/2012 | Himmelstoss ........... G01S 7/35 342/173 |

FOREIGN PATENT DOCUMENTS

| DE | 102005053442 A1 | 5/2007 |
| DE | 102008046162 A1 | 3/2010 |
| DE | 102009047931 A1 | 4/2011 |

(Continued)

*Primary Examiner* — Matthew M Barker
(74) *Attorney, Agent, or Firm* — Husch Blackwell LLP

(57) ABSTRACT

A method for determining the functionality of a switchable reception amplifier of a radar system with a transmitting unit, a receiving unit and a voltage-controlled oscillator, wherein, before the radar system is started up, calibration is carried out in order to compensate for a frequency deviation of the frequency emitted by the oscillator. The invention provides for at least one calibration cycle to be run with at least one first signal at a first frequency and one second signal at a second frequency during calibration of the oscillator, wherein the first signal and the second signal are transmitted by the transmitting unit and are received by the receiving unit, wherein the reception amplifier is switched with a switching sequence, which results in amplitude modulation of the first and second signals, and the amplitude modulation is used to determine the functionality of the reception amplifier.

7 Claims, 4 Drawing Sheets

(56) References Cited

FOREIGN PATENT DOCUMENTS

EP        1672381 A1    6/2006
WO     0028349 A1    5/2000

\* cited by examiner

METHOD OF DETERMINING THE OPERABILITY OF A SWITCHABLE RECEPTION AMPLIFIER

CROSS REFERENCE

This application claims priority to PCT/EP2013/063755, filed Jun. 29, 2013, which itself claims priority to German Application No. 10 2012 106506.3, filed Jul. 18, 2012, which are both hereby incorporated by reference.

FIELD OF TECHNOLOGY

The invention relates to a method for determining the operability of a switchable reception amplifier, and, more particularly, to a device for determining the operability of a switchable reception amplifier.

BACKGROUND

From DE 10 2009 047 931 A1 is known a method for determining the distance and relative velocity of a distant object, wherein for the determination of these parameters a radar system has a transmitting unit, a receiving unit and a voltage-controlled oscillator. The transmitting unit emits a signal, wherein the echo on the signal is received by the receiving unit. By means of a distance analysis, the distance and relative velocity of a distant object can then be determined. In the event that the received reflected signal should be too weak for analysis, it is the state of the art to amplify this signal by a switchable reception amplifier. However, it has been found to be disadvantageous that the functionality of the switchable reception amplifier can only take place via a plausibility check of the received signal. This means that in case of an incorrect amplification of a sufficiently strong received signal, the signal will be distorted, which may lead to failures of the entire radar system. In the opposite case, i.e. if due to a defect the reception amplifier is not turned with in a weak signal reception, the range of the detection of a remote object by the radar system may be substantially reduced.

SUMMARY OF THE INVENTION

It is an task of the present invention to provide a method and an apparatus for determining the operability of a switchable reception amplifier of a radar system, wherein the method and apparatus are metrologically simple and reliable, which allows rapid and accurate determination of the operability of the switchability of the reception amplifier.

Features and details, which are described in connection with the invented method, are of course also related to the device and vice versa. The features mentioned in the claims and in the description can be essential to the invention either individually or in combination.

In one embodiment, the invention discloses a method for determining the operability of the switchability of a reception amplifier, a radar system with a transmitting unit, a receiving unit and a voltage-controlled oscillator, wherein before the start-up of the radar system, a calibration for compensating a frequency deviation of the output frequency of the oscillator is performed. According to the invention it is provided that during calibration at least one calibration with at least a first signal having a first frequency and a second signal having a second frequency is performed. Here, the first signal and the second signal are transmitted by the transmitting unit. The transmitted signals are received by a receiving unit, wherein the received signals in the base band can be amplified by a reception amplifier. The reception amplifier is connected to a switching sequence, whereby the first and the second signal undergo an amplitude modulation. This amplitude modulation is then received and analyzed (e.g., used) to determine the functionality of the reception amplifier. The advantage of this method lies in the explicit determination of the functional capability of the reception amplifier by determinable transmitted signals. Determined in this context means that the signals and the overlay of the amplitude modulation on these signals are controlled by a set of rules. While at least part of the receiving units must be used during the calibration of the radar systems of the prior art, this is not the case with the radar system of the invention. The calibration of the radar system according to the invention is carried out by a direct analysis of the emitted signal of the transmitting unit. Hereby it is achieved that the receiver unit for calibration of the transmission signals does not need to be used. Still, at the receiver unit are located the transmitted signals from the transmitting unit, which is used for further analysis and determination of the functionality of the reception amplifier. The received signal of the transmission unit is amplitude-modulated by a switching sequence of the reception amplifier. This amplitude modulated signal can then be used regardless of the actual calibration of the transmitter unit for an analysis to determine the operability of the switchable reception amplifier. Thus, independently of the calibration of the transmitter unit an explicit review of the ability to switch the reception amplifier can be done. It is also advantageous, that a calibration of the transmitter unit and an explicit verification of the switchability of the reception amplifier can occur simultaneously by the inventive method and the inventive device.

The calibration of the oscillator has substantially two tasks. The first task consists in compensating a frequency drift of the oscillator, which is mainly due to possible temperature changes during the operation. Other effects, such as load pulling or aging can also be considered. Compensating for the frequency drift is necessary to avoid exceeding the respective predetermined frequency band limits under all circumstances. It is done by adjusting the tuning voltage range of the oscillator. The second task consists in compensation of a non-linear characteristic of the oscillator.

The fact that the transmitting unit is coupled to a digital signal processor, said digital signal processor specifying the first and second digital signal, particularly advantageous. The specification of digital signals to be transmitted, for example, allows a numerical frequency determination of the emitted signal. This takes place advantageously already during the calibration, where the transmitted signal of the oscillator is transmitted through a frequency divider to a frequency counter, wherein the signal received therein can again be digitally displayed. This enables the digital signal processor to detect the frequency of the transmitted signal. This can be done in the digital domain by a comparator or by converting the digital values into numerical values, preferably in decimal or hexadecimal representation.

It is advantageous that the control of the voltage-controlled oscillator is performed by a digital-to-analog converter. This allows a precise setting-up of the transmitted frequency by the transmitting unit. Moreover, setting up a plurality of individual digital-to-analog converter values, at a frequency of 24 GHz, for example, can be carried out easily and effectively. In addition, the specification of precise time intervals of, e.g., one millisecond per radiated frequency on the oscillator is exactly feasible.

It is also advantageous that the receiving unit is coupled, via an analog-to-digital converter, to the digital signal processor, and the received signal is digitized by the analog-to-digital converter. The mapping of the analog value into a digital value allows a simple numeric or digital comparison with the transmitted signal. Also, the analysis of the received signal to determine the distance or the relative speed of an object may be done on a digital or numerical level. As a result, the analysis can be advantageously done via a computer unit.

It is preferable that the transmission of the first and second signals by the oscillator is periodically repeated. This allows measurement error to be statistically adjusted, e.g. by ascertaining an average value. Since the environment, in which the radar system is used during the calibration can change, for example, by the use of the radar system in a motor vehicle, it could cause unintentional reflections of the transmitted signal to objects which are received by the receiving unit. Thus the proportion of the switching sequence can be filtered out in the received signal more accurately. Superimposing unintentionally reflected signals to the receiving signal and the amplitude modulation generated by the switching sequence can be easily separated.

It is also advantageous that the switching frequency of the reception amplifier is controlled by the digital signal processor. The digital signal processor, which may be a computer unit, can switch on the reception amplifier in accordance with the set digital value at the analog converter. So it is also made possible for the digital signal processor to specify the switching sequence in a calibration cycle. This allows imparting a frequency to the analog received signals, which can be for example 20 kHz. This means a switch-on and switch-off time of 25 ps. So the period of the switching sequence is 50 μs.

Moreover, it is advantageous that the first and second signals generated by the voltage-controlled oscillator is detected by a frequency counter. The use of a frequency counter makes it possible to use the analog signals including the digital or numerical analysis by the digital signal processor. A comparison of the set frequency of the digital signal processor by the digital-to-analog converter to the oscillator with the output signal of the oscillator can be done on a numerical level.

The use of receiver units during the calibration can thereby be omitted.

The fact that the amplitude modulation represented by a fast Fourier transformation into the frequency range and in the switching sequence of the reception amplifier is detected is particularly advantageous. Thus, the amplitude modulation caused by the switching sequence of the reception amplifier can be detected by means of digital signal processing. The frequency mapping of the time domain onto the frequency range by a Fourier transformation represents a simple way to determine the switching sequence by a computation unit. Here, a real-value fast Fourier transformation with, for example, a length of 512 can be applied. Thus, the generated range spectrum has 256 points, the highest point of a sampling rate of 40 kHz corresponding to a frequency of 20 kHz. It is exactly at this point in the amplitude spectrum that the signal component can be seen in the form of a peak caused by the receive amplifier.

The task of the invention is also resolved by a device for determining the functionality of a reception amplifier of a radar system according to claim 9. The radar system in this case has a transmitting unit, a receiving unit and a voltage-controlled oscillator, wherein before the start-up of the radar system, a calibration for compensating a frequency deviation of the output frequency of the oscillator is performed. For this purpose the invention provides that, during the calibration of the oscillator, at least one calibration cycle with at least one first signal with a first frequency and a second signal having a second frequency can be run. The first signal and the second signal are transmittable by the transmitting unit, and can be received by the receiving unit. The reception amplifier is connected to a switching sequence, which leads to an amplitude modulation of the first and second signals. The amplitude modulation can be used to determine the functionality of the reception amplifier.

BRIEF DESCRIPTION OF THE DRAWINGS

Reference is now made more particularly to the drawings, which illustrate the best presently known mode of carrying out the invention and wherein similar reference charac-ters indicate the same parts throughout the views.

DETAILED DESCRIPTION OF THE DRAWINGS

Figure 1:
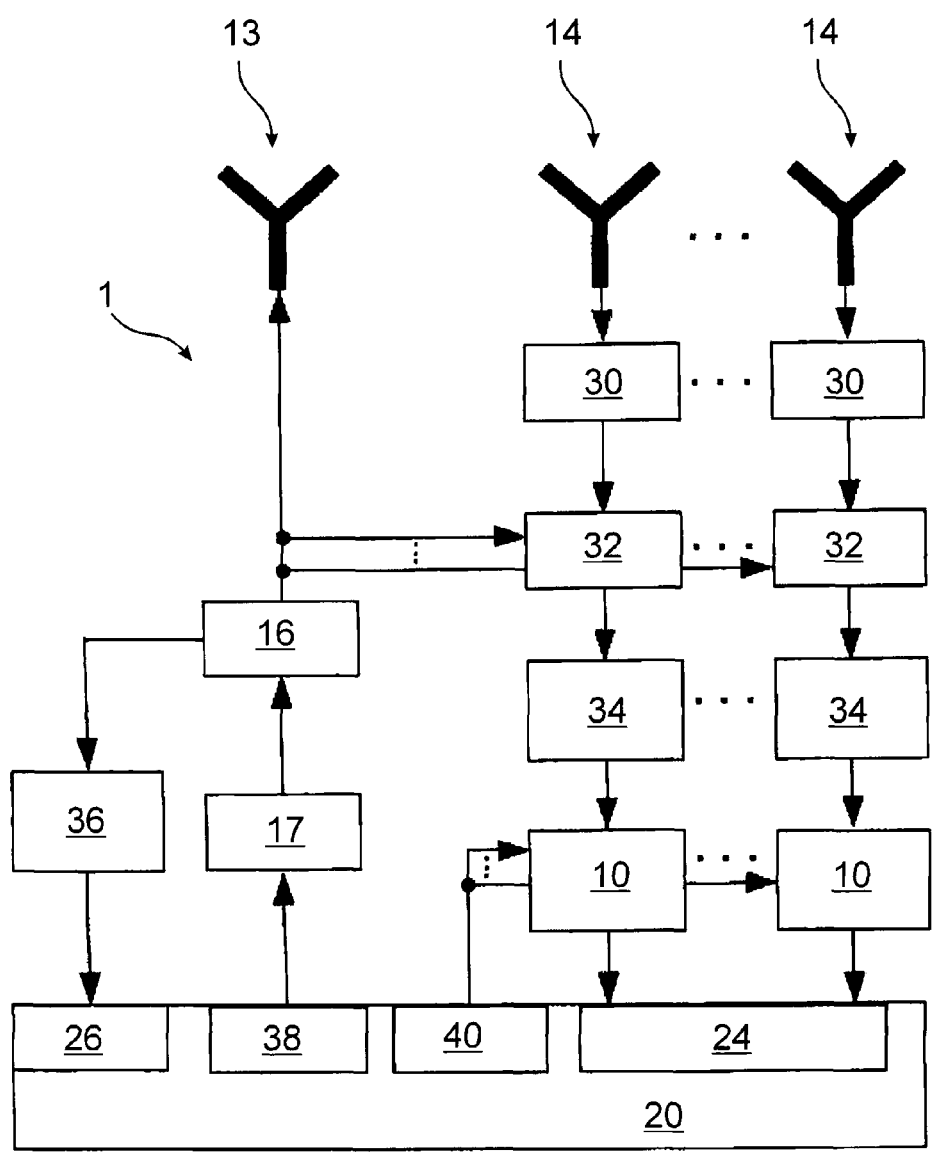
FIG. 1 shows a schematic structure of a radar system.

FIG. 1 shows schematically the structure of a radar system. A transmitting unit 13 has a voltage-controlled oscillator 16, wherein for calibration of the radar system 1, a first signal 11 at a first frequency and a second signal 12 at a second frequency can be transmitted from the transmitting unit 13. The oscillator 16 is thereby controlled via a digital-to-analog converter 17, which in turn is controlled through an interface 38 of a digital signal processor 20. The first signal 11 and the second signal 12 of the oscillator 16 is supplied via a frequency divider 36 to a frequency counter 26 that is built in the digital signal processor 20. So it enables the digital signal processor 20, which can be a computer unit, to analyze the transmitted signal 11 and the second signal 12 of the oscillator 16 via the signal received by the frequency counter 26.

The calibration cycle with its first signal 11 and its second signal 12 essentially fulfills two main tasks. The first task consists in compensating a frequency drift of the oscillator 16, which may be mainly due to a change in temperature during operation. The frequency drift of the oscillator 16 can also result from other effects such as load pulling or aging. Compensating for the frequency drift is necessary to avoid exceeding the respective predetermined frequency band limits under all circumstances. It can be performed by adjusting the tuning voltage range of the oscillator 16, and the corresponding digital values of the digital-to-analog converter 17 in a calibration cycle. The second task consists of a compensation of a non-linear characteristic of the oscillator 16.

Radar systems provide the LFMSK transmission method. This LFMSK transmission method provides an interleaved transmission of three sub-signals A, B and C, where each of the three sub-signals provides a frequency response with equidistant frequency steps. Compliance with these constant distances between two adjacent frequencies of a signal part is of imminent importance for target detection. Due to non-linearity of the oscillator characteristic (frequency versus tuning voltage) results in non-equidistant tuning voltages or digital-to-analog converter values in the set of equidistant frequency steps These must be recalculated in each calibration cycle for each of the adjusted transmission frequencies, since the course of the oscillator characteristic may depend on many factors, such as temperature, load pulling or aging and thus it permanently changes during operation.

It is clear that during the calibration cycles a receiving unit 14 of the radar system 1 is indeed present and functional, but is not required for the calibration of the oscillator 16. Thus, at least a part of the receiving units 14 can be used during the calibration to determine the operability of a reception amplifier 10. The signals transmitted from the transmitting unit 13 can be received via receiving units 14. The signal received by the receiving units 14, is guided via a first amplifier stage 30 (low noise amplifier, LNA) to a mixer 32. There, through a coherent mix with the oscillator output signal, a baseband signal arises, whose amplitude response is determined for an ideal mixer solely by the phase position of the receiving signal in relation to the oscillator signal. The analog filtering subsequent to the mixer 32 is designed as a band-pass 34 to suppress higher frequency noise components, on the one hand, and low frequency, parasitic mixing products on the other. The analog filtering can be integrated as an analog circuit in the reception amplifier 10. The reception amplifier 10 is designed for the purpose of increasing the receiver dynamic, in which, for example, with an imminent overloading of the receiver unit 14 by very strong signals, the gain can be reduced to a lower value.

There can be implemented two gain factors, wherein the switching takes place via a separate control line 40, which can be driven by means of a general-purpose JO pin (GPIO) of the digital signal processor 20. The difference between a high and a low gain may be approximately 17 dB. Via an analogue-to-digital converter 24, which may be integrated in the digital signal processor 20, the analog signals received via the receiving unit 14 are converted into digital values. The analog-to-digital converter 24 may have, for example, a resolution of 12 bits.

Figure 2:
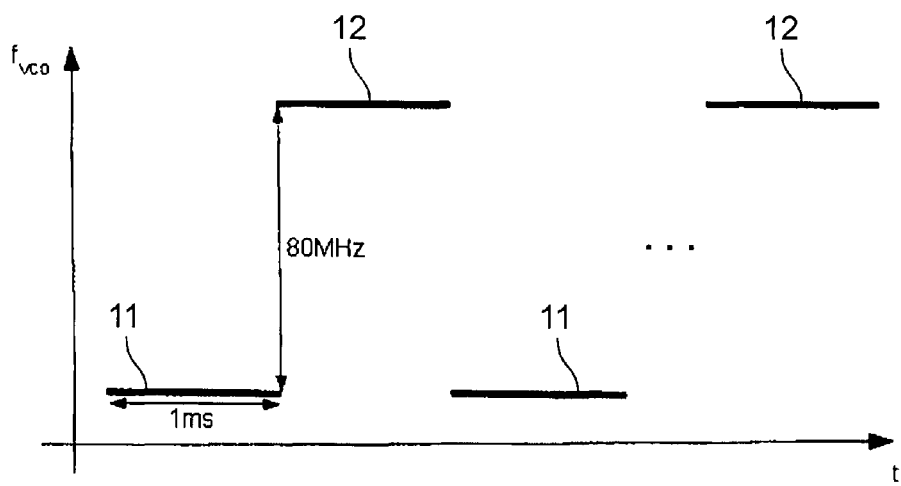
FIG. 2 shows a schematic diagram with a first and a second signal.

FIG. 2 shows schematically a diagram of a first signal 11 and a second signal 12. The duration of the first signal 11 and the second signal 12 is in this case a millisecond. The frequency offset of the first signal 11 from the second signal 12 is 80 MHz. There can be used for calibrating a frequency counting procedure by a frequency counter 26, which may provide for setting a plurality of individual digital-to-analog converter values or frequencies, for example, at 24 GHz. Every individual frequency is kept constant over a period of time, for example, one millisecond. During this time, an efficient counting of the frequency that corresponds to the set digital-analog converter value must be performed. The calibration requires adjustment and subsequent counting of a plurality of so-called supporting frequencies within one calibration cycle divided over the transmission frequency band. Accordingly, a specific excitation of the receiving units 14 is performed by precisely those signals that are set in calibration cycles at the oscillator 16, specifically by means of signals with frequency hopping, which can be in the order of up to 80 MHz to 100 MHz bandwidth and 180 MHz to 200 MHz bandwidth. By the effect of the mixer bias, a direct coupling of the transmission signal occurs in the receiver units 14 and causes there still signals even in adverse situations, in which no radar targets are present and consequently no signals reach the receiving units. The detection of these signals allows a reliable diagnosis of the receiving units or a channel failure even in unfavorable situations. In a calibration cycle, alternating signals can now be fed to the receiver unit 14 of the radar system 1 in all environmental conditions, so that voltage waveforms of zero volts may be present at the output of the band pass filter 34 of the receiving units 14. A rapid and selective switching of the reception amplifier 10 between a high and a low gain, that is a shift sequence 15, causes a corresponding amplitude modulation 18 of the output signals of the bandpass filters 34.

Figure 3:
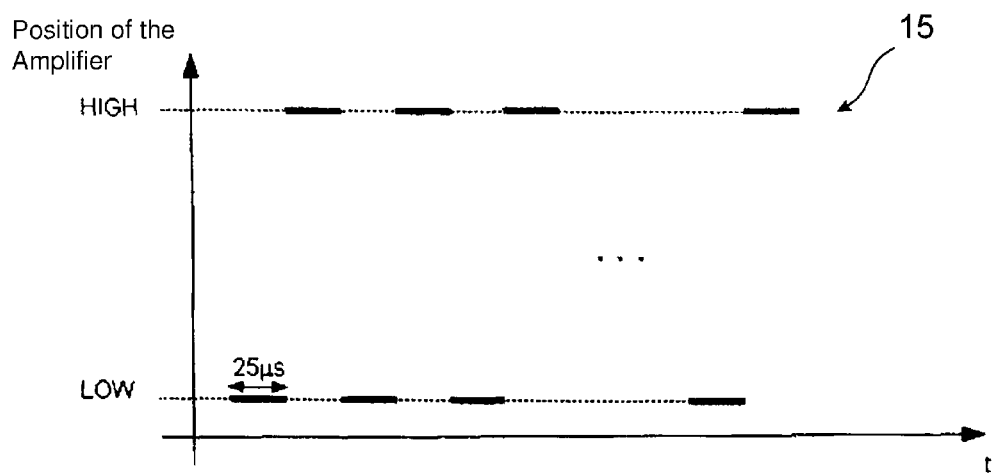
FIG. 3 shows a schematic diagram of a switching sequence.

FIG. 3 schematically shows a diagram of a switching sequence 15 of the reception amplifier 10. The specific and rapid switching of the reception amplifier 10 causes an amplitude modulation. This can result in switching of the reception amplifier 10 between a high and a low gain, for example, every 25 µs. With this operation, a signal component with a frequency of 20 kHz can be impressed upon the analog reception signals of the various receiving units 14. Now, a conclusion can be deduced regarding the functioning of the respective reception amplifier 10 on the basis of the detection of this signal component in the receiving units 14 of the individual channels. Subsequent processing of the received signals, that is the digital signals, by the analog-to-digital converter 24, which are made available to the digital signal processor 20, allow to make a conclusion on the operability of the reception amplifier 10. For the duration of the process of the described sequence of frequencies and the described switching sequence 15, a scanning of the received signals can be made at a rate of 40 kHz such that for each receiving unit 14 per amplifier position, a scanned value exists.

Figure 4:
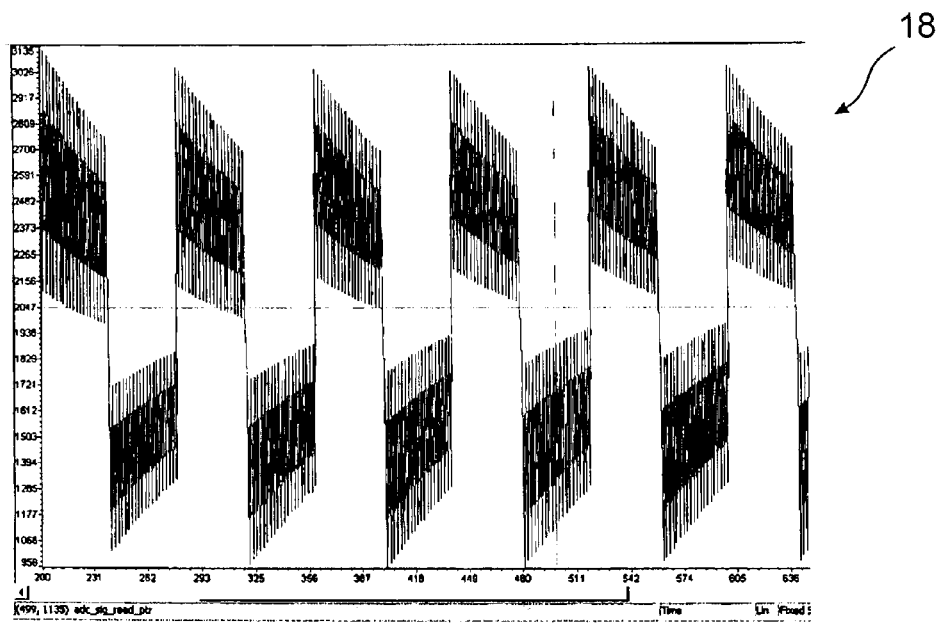
FIG. 4 shows a schematic diagram of a reception signal in an activated switching sequence.
Figure 5:
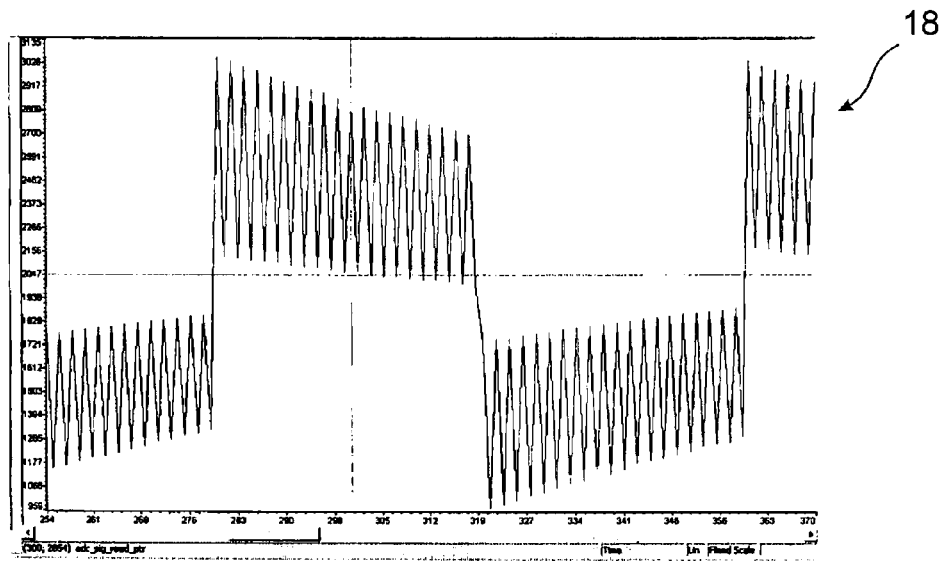
FIG. 5 shows a schematic diagram of a reception signal in an activated switching sequence in a high resolution.

FIG. 4 schematically shows a diagram of a received signal in an activated switch sequence 1. This diagram shows an example of a possible detected signal of a receiving unit 14 of a real radar system 1. The excitation of the received signal by the receiving unit 14 occurred due to signals or switching sequence 15 performed in FIG. 2 and FIG. 3. The effects of the above two excitations are clearly visible. On the one hand, the component of the oscillator end signal of FIG. 2 is present, which represents the slowly varying signal component with a period of 80 samples and a repetition rate of 500 Hz. This signal component modulates on the other hand the component of the switching sequence of the receiving units 14; it can be seen with a period of two samples, or a repetition frequency of 20 kHz. FIG. 5 schematically shows the received signal with activated switching sequence 15 in a higher temporal resolution. The detection of this higher-frequency signal component with the help of digital signal processing now enables to make a conclusion on the functional capability of the amplifier and switching in the receiver branches. On the basis of significant expression of this higher-frequency signal component it can be seen that the detection is possible in many ways and manners.

Figure 6:
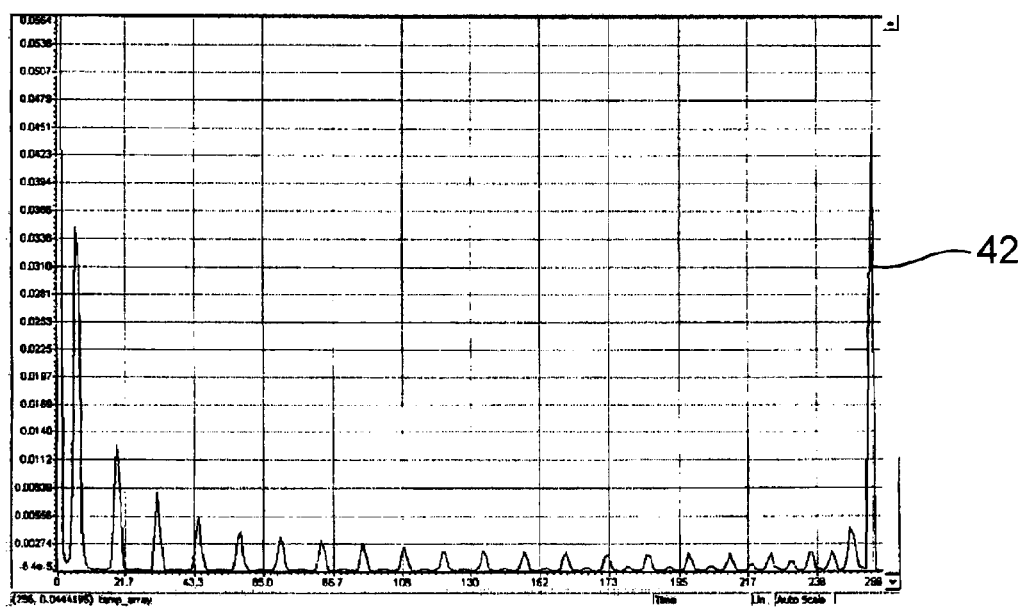
FIG. 6 shows a schematic diagram of an amplitude spectrum of a signal receiving unit.

FIG. 6 schematically shows an amplitude spectrum of a signal of a receiver unit 14. This amplitude spectrum represents, by way of example, detection in the frequency range. Fourier transformation (FFT) can be used for this purpose. The application of a real-valued FFT of length 512 can be performed on the signal of each receiving unit 14. The signal component with a frequency of 20 kHz to be detected, which was clearly seen already in FIG. 4 and FIG. 5, is also clearly observed in FIGS. 5 and 6 in the amplitude spectrum. The amplitude spectrum generated by an FFT of the length of 512 has 256 points, the highest point corresponding to a sampling rate of 40 kHz of a frequency of 20 kHz. It is exactly at this point of the amplitude spectrum that the signal component in the form of a peak 42 caused by the amplifier switching can be seen in FIG. 6. The other peaks all there are caused by the signal component of the oscillator transmitter signal at the basic frequency of 500 Hz and its harmonics, as well as its modulation products. The diagnosis of the switching amplifier can be concentrated on the detection of the presence of a peak at the point 256 of the amplitude spectrum of a reception channel. Thus, it can be very simply possible, both qualitatively and quantitatively, to determine the functionality of the reception amplifier 10 by signal processing technology.

The invention claimed is:

1. A method for determining a switchability of a switchable reception amplifier of a radar system with a transmitting unit, a receiving unit and a voltage-controlled oscillator comprising the steps of:
    calibrating the oscillator by compensating for a frequency deviation of a frequency emitted by the oscillator;
    running at least one calibration cycle as part of calibration of the oscillator with at least one first signal at a first frequency and a second signal at a second frequency during calibration of the oscillator,
    transmitting the first signal and the second signal by the transmitting unit,
    receiving the first signal and the second signal by the receiving unit,
    switching the reception amplifier with a switching sequence, resulting in amplitude modulation of the first signal and second signal,
    applying a Fourier transformation on the amplitude modulated first signal and second signal to generate an amplitude spectrum,
    detecting the presence of a peak at an expected point of the amplitude spectrum caused by the amplifier switching, and
    determining the switchability of the reception amplifier based on the presence of the peak.

2. The method according to claim 1, wherein the transmitter unit is coupled to a digital signal processor, wherein the digital signal processor digitally specifies the first signal and second signal.

3. The method according to claim 2 wherein the receiver unit is coupled via an analog-to-digital converter to the digital signal processor, wherein the received signal is digitized by the analog-to-digital converter.

4. The method according to claim 2 wherein the switching frequency of the reception amplifier is controlled by the digital signal processor.

5. The method according to claim 1 wherein the control of the voltage-controlled oscillator is performed by a digital-to-analog converter.

6. The method according to claim 1 wherein the transmission of the first signal and the second signal is periodically repeated by the oscillator.

7. The method according to claim 1 wherein the generated first signal and the second signal of the voltage-controlled oscillator is detected via a frequency counter.

* * * * *